United States Patent

Greenwood

[11] Patent Number: 6,066,067
[45] Date of Patent: May 23, 2000

[54] POSITION SERVO SYSTEMS

[75] Inventor: Christopher John Greenwood, Preston, United Kingdom

[73] Assignee: Torotrak Limited, Leyland, United Kingdom

[21] Appl. No.: 09/068,856
[22] PCT Filed: Nov. 20, 1995
[86] PCT No.: PCT/GB95/02713
   § 371 Date: May 19, 1998
   § 102(e) Date: May 19, 1998
[87] PCT Pub. No.: WO97/18982
   PCT Pub. Date: May 29, 1997
[51] Int. Cl.[7] .............................. B62D 5/00; F16H 15/38
[52] U.S. Cl. ...................... 476/40; 476/42; 74/388 PS
[58] Field of Search ................. 74/388 PS, 498; 180/443; 476/40, 42, 39; 475/216, 214

[56] References Cited

U.S. PATENT DOCUMENTS 4,751,976  6/1988  Higuchi et al. .
4,922,788  5/1990  Greenwood .

FOREIGN PATENT DOCUMENTS 0 084 724 A1  8/1983  European Pat. Off. .

OTHER PUBLICATIONS

Japanese Abstract, vol. 013, No. 89, dated Mar. 1989, JP-A-6321770.

Primary Examiner—David A. Bucci
Assistant Examiner—William C Joyce
Attorney, Agent, or Firm—Davis and Bujold

[57] ABSTRACT

A position servo system exemplified by a power-assisted steering system in which a power-driven continuously-variable-ratio transmission ("CVT") of the variable-ratio-epicyclic type, and particularly of the toroidal-race rolling-traction type, is arranged coaxially with the wheel or other rotary actuating member and the steering or other driven mechanism, and delivers an output to augment the steering effort in response to an error between the positions of the actuating member and the steering mechanism. Mechanisms described to prevent interference with the normal manual connection between the actuating member and the steering mechanism should the CVT cease to rotate, and on occasions when the normal sense of operation is reverse and the steering mechanism tends to steer the actuating member. Mechanisms are also described, where the CVT is of the toroidal-race type, to ensure quality between the forces exerted on the steering mechanism by all its connections with the CVT.

16 Claims, 2 Drawing Sheets

POSITION SERVO SYSTEMS

This invention relates to position servo systems, in which the detection of an error between the desired relative positions of actuating (i.e. driving) and driven members causes power to be applied to tend to reduce that error. The invention applies particularly but not exclusively to power-assisted steering systems, of the known general kind in which a steering mechanism—for instance of rack or worm type—is driven by a gear or pinion, typically carried at one end of a shaft, the other end of which tarries a steering wheel or other control member. Means are provided to sense torsional deflection in the shaft. When that deflection exceeds a predetermined value, indicating that a substantial steering effort is being applied, an auxiliary source of power is activated and applied to the worm or gear to augment the steering wheel torque, and so reduce the deflection in the shaft.

BACKGROUND OF THE INVENTION

It has been proposed in Japanese Patent Publication 63291770A to incorporate a continuously-variable-ratio transmission ("CVT") of the "variable-ratio-epicyclic" type in a power-assisted steering system. The customary components of such a CVT are an epicyclic gear set and a speed-varying component or "variator", the latter comprising an input member, and intermediate reaction member and an output member. By the "variable-ratio-epicyclic" type of CVT we mean the type in which the axes of rotation of all three of the elements of the variator are concentric, so that the total configuration of the variator bears some resemblance to a conventional geared epicyclic or planetary gear set. The present invention is to be distinguished from the embodiment of JP-A-63291770 principally in that in the system described in that prior publication, the CVT does not generate and transmit any power to assist the steering effort provided by the operator. Instead, the function of the CVT appears to be to vary the manual steering ratio, between the steering wheel and the steering rack to which it is connected, so that quite separate means to generate power assistance receive relatively strong signals at low vehicle speeds and weak ones at high speeds.

The present invention is also of course to be distinguished from the many prior automotive CVT's of concentric arrangement (of which U.S. Pat. No. 4,922,788 shows an example), by the fact that in those CVT's the sole source of motive input has been the prime mover of the automobile. In the position servo systems to which the present invention relates there must be two separate sources of such inputs. For example, in a power steering system a first and manual input is applied via the steering wheel and the CVT must be driven by a second source of motive power in order to contribute the power-assistance that is required.

BRIEF DESCRIPTION OF THE DRAWINGS

The invention will now be described by way of example with reference to the accompanying figures of simplified and partly-schematic drawings in which.

DESCRIPTION OF THE PREFERRED EMBODIMENTS

Figure 1:
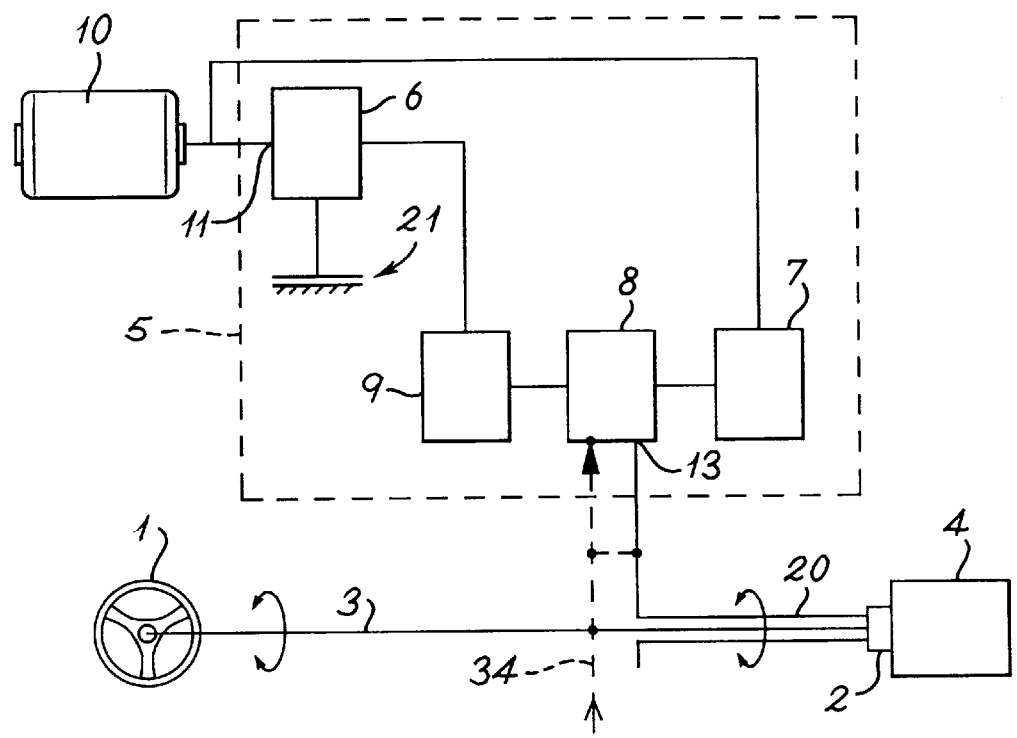
FIG. 1 is a schematic view of a power assisted steering system.

FIG. 1 shows that the output of a constant speed electric motor 10 is connected both to the "input" member 7 of a variator of the variable-ratio epicyclic type and also (at 11) to one component of a typical three-part epicyclic gear set 6. The other two components of the gear set 6 are connected to the "output" member 9 of the variator and to a torque-limiting device 21 respectively. The third and intermediate member 8 of the variator produces an output 13 which constitutes one input to a pinion 2 driving a steering rack 4, the other input being from a steering wheel 1 by way of a shaft 3. The parts which make up the CVT are shown within the broken line 5 and comprise the gear set 6 and variator (7, 8 and 9), and those parts are mounted to rotate as a single assembly with a tube 20, which is coaxial with shaft 3 and by way of which they are connected to pinion 2. Shaft 3 and tube 20 thus constitute a pair of concentric rotary actuating inputs to the pinion 2. Because the torque-limiting device 21 does not itself need to rotate, it can for instance be in the simple and reliable form of a stationary brake.

Figure 2:
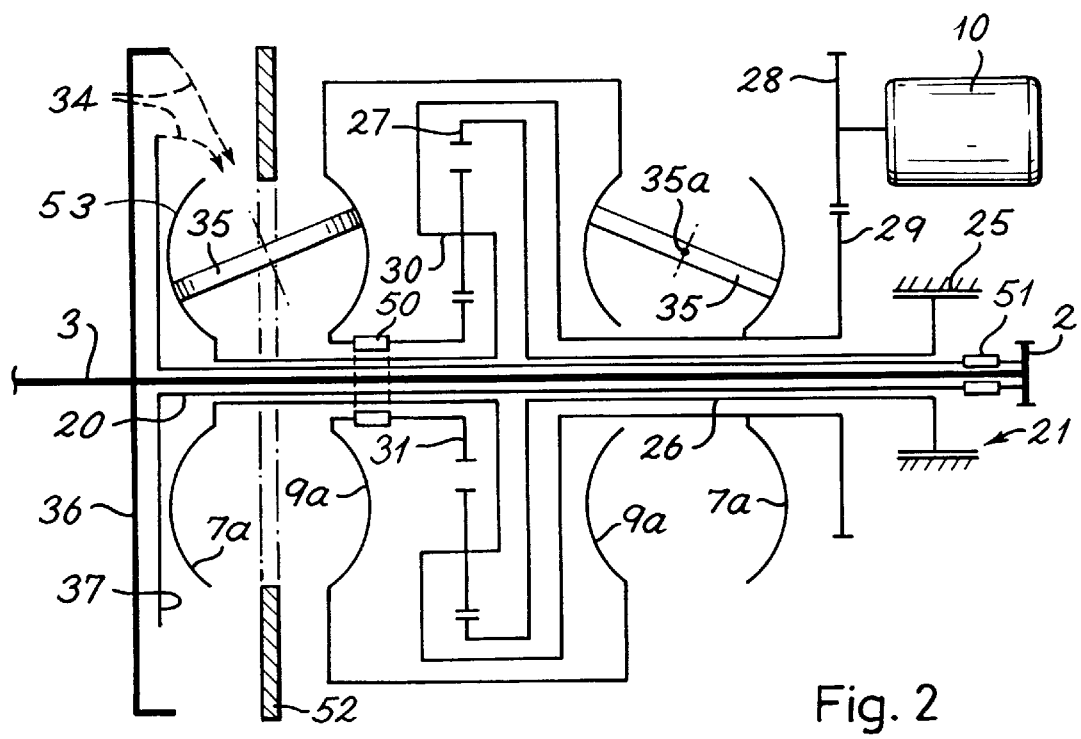
FIG. 2 includes a sectional view taken in a plane including the shaft 3.

FIG. 2 adds some detail to a version of FIG. 1 in which the variator is of the toroidal-race rolling-traction type, and shows in particular how the CVT is arranged to rotate concentrically around the steering shaft 3. A stationary reaction member 25 engages, by way of the brake-type torque-limiting device 21, with a sleeve 26 carrying the annulus gear 27 of gear set 6. Motor 10 engages, by way of gears 28 and 29, both with the end discs, that is to say the input disc 7, of a toroidal-race variator and also with the planet carrier 30 of set 6. The output discs 9 of the variator are mounted in common with each other and also with the sun gear 31 of the epicyclic gear set. It should be noted both that double planets are carried by the carrier 30, in order to reverse the directions of rotation of discs 7, 9 as is necessary in a toroidal-race variator, and that gear ratios are advantageously chosen to give equal and opposite speeds of rotation to the discs. The "intermediate member" 8 of the variator in this embodiment comprises two sets of traction-transmitting rollers and their associated carrier assemblies, one such set being disposed between one pair of the discs 7, 9 and the second set between the other pair. One such roller of each set is shown in outline at 35. Typically there will be three such rollers in each set, disposed at equal angular intervals about the axis of shaft 3.

Reference 34, in FIG. 2, indicates how control of the system must link the steering shaft 3, the variator intermediate member 8, and the tubular connection 20 to pinion 2. FIG. 2 shows flanges 36 and 37, carried by shaft 3 and tube 20 respectively, and FIG. 3 illustrates the principles behind one means by which flange 36 could be connected with the rollers 35, so as to cause the rollers to change ratio when shaft 3 exceeds a given torsional deflection (i.e. when the angular positions of shaft 3 and sleeve 20 differ by more than a given amount), and how the torque reaction experienced by the rollers can then be applied to the pinion 2 by way of tube 20, thus providing a power-steering effect by augmenting the force exerted by the driver on the steering wheel 1, so tending to reduce the difference to zero.

Three further features of FIG. 2 should also be noted. First a centrifugal clutch or equivalent safety device 50, located between the sun gear 31 and the output discs 9 and operable to ensure that the sun disconnects from the discs, and the power-steering linkage is therefore disabled, should the sun gear 30 cease to rotate because, for example, the motor 10 has failed. If this happens, the operator must steer manually by way of the wheel 1, and the disabled power-steering mechanism must not interfere with his doing so. Secondly, a suitable unidirectional lost-motion connection 51 located between the pinion 2 and the flange 37/reaction plate 41. This is to ensure that the power-steering mechanism works to augment the steering effort when the operator turns the wheel 1 with the intention of moving the rack 4, but allows the pinion 2 to turn the wheel 1 when it is appropriate for the steering effect to be in the reverse direction. This reverse effect occurs, for instance, due to road wheel camber when the vehicle is coming out of the bend, when without the one-way effect of the device 51 the power steering mechanism might tend to resist the restoration of the wheel 1 to the straight-ahead position. Thus item 51 effectively operates so that if the driver lets go the wheel 1, the position taken up by that wheel is determined by the road wheels. The third further feature to be noted is a ring 52 located adjacent one of the sets of rollers 35 and nominally coaxial with shaft 3, but with a central aperture 53 large enough to enable the ring to move slightly off center without fouling the rollers. The function of this ring will be explained in connection with the embodiment of FIG. 4.

Figure 3:
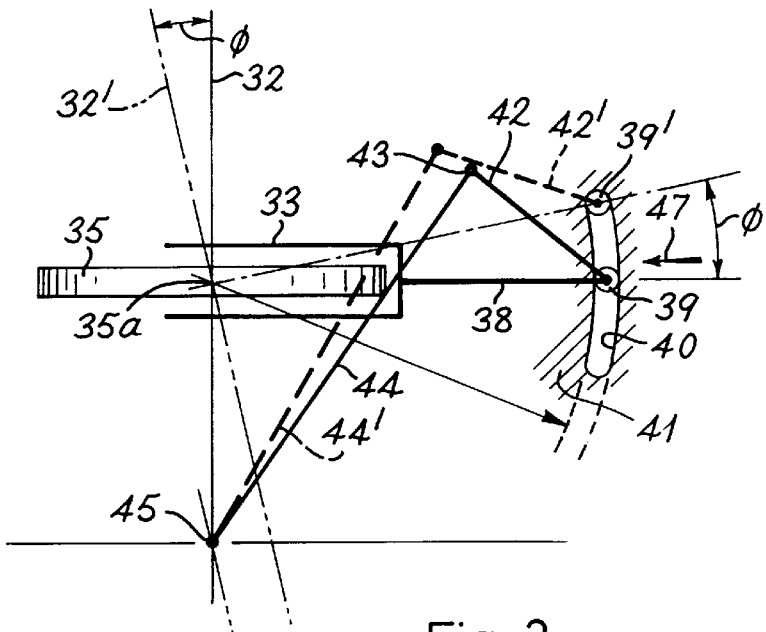
FIG. 3 illustrates linkages and movements associated with one of the rollers of the variator.

FIG. 3 shows one of the rollers 35, mounted to rotate about an axis 32 in a carriage 33 connected to a rod 38 carrying a ball end 39 mounted to slide in an arcuate slot 40 formed in a reaction plate 41. As is customary and well-understood in the art, the center 35*a* of roller 35 is constrained to lie on the fixed "center circle" of the torus to which the discs 7, 9 conform. The arc of slot 40 has the same center 35*a*. Ball end 39 is pivoted to a link 42, which is in turn pivoted at 43 to one end of a link 44, the other end of which is pivoted to flange 36, and should be visualised as rotating in a plane at right angles to the paper in FIG. 2, but parallel to the paper in FIG. 3 and as if point 45 coincided with the axis of shaft 3. Reaction plate 41 is attached to and lies parallel to the face of flange 37, so that plate and flange move together. With roller 35 in the position in which it is shown in FIG. 3, axis 32 will coincide with the common axis of shaft 3 and tube 20. This represents the equilibrium position of the system, in which there is negligible torsional deflection in shaft 3, and in which the ratios of the CVT are chosen so that it is in the so-called "geared neutral" condition, in which the ball ends 39 lie in their mid-position within the slot 40. There is thus no torque load on the rollers 35, and therefore ball ends 39 are exerting no thrust on reaction plate 41 in the direction indicated by the arrow 47. Motor 10 is therefore exerting no torque on pinion 2 by way of flange 37 and tube 20. If however shaft 3 undergoes a torsional deflection, resulting in a corresponding angular error between shaft 3 and tube 20, this displaces links 42, 44 to the positions shown at 42' and 44' respectively, and tilts roller 35 so that it is now aligned with the ball at another position within the slot 40. In FIG. 3 this is shown at 39', one limit of its range of positions within the slot. The displaced roller axis 32' now no longer intersects the axis of shaft 3 which is, of course, also the variator axis. Roller 35 therefore experiences a torque reaction, which produces a reaction force (resolvable in the direction of arrow 47) on plate 41 (i.e. on flange 37), and thus via tube 20 a torque on pinion 2 which supplements the torque being exerted on it by way of wheel 1 and shaft 3. This supplementary torque then tends to decrease to zero as the angle φ does likewise, and the ball end 39 returns to its mid-position within the slot.

Figure 4:
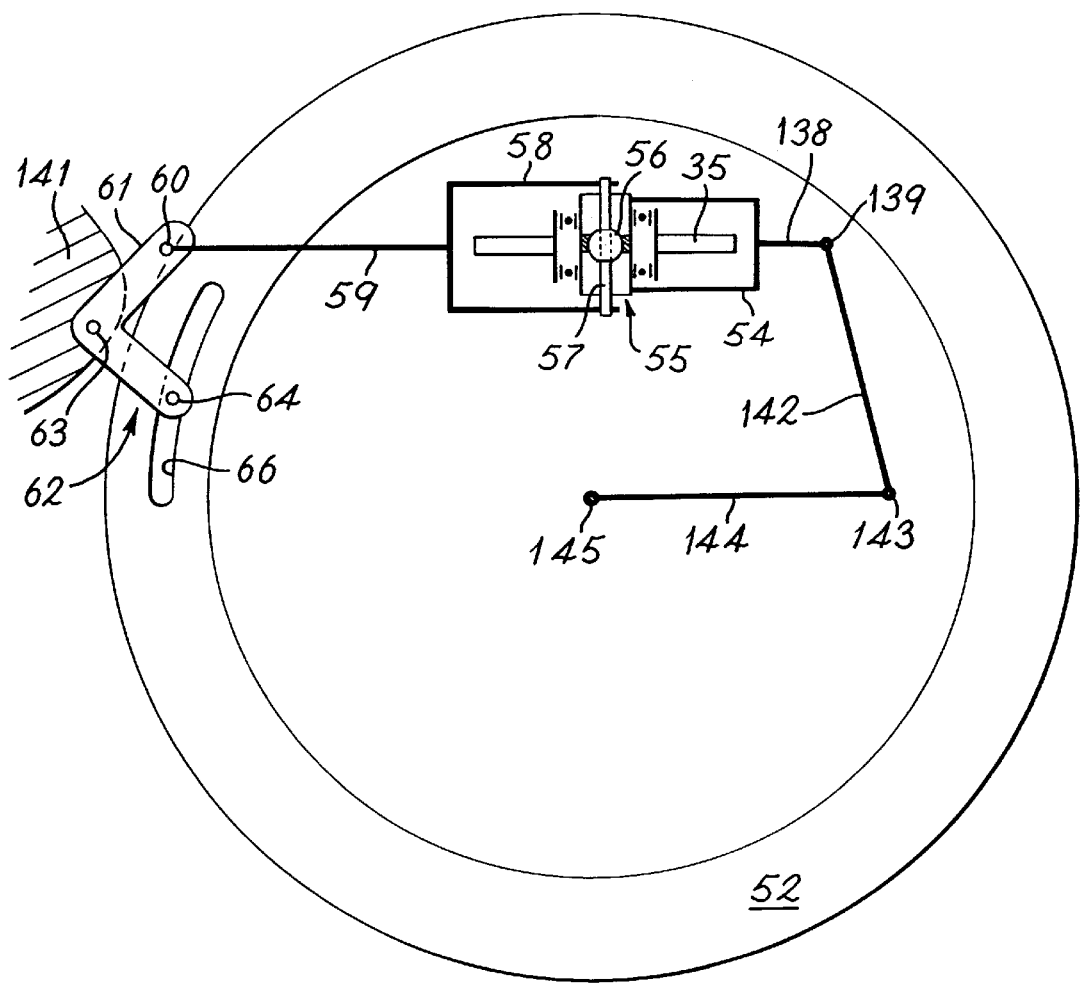
FIG. 4 shows an alternative to the arrangement shown in FIG. 3.

In designing the embodiment illustrated in FIG. 4 it was appreciated that roller reaction forces—see reference 47 in FIG. 3—are large, and that there are potential advantages, such as reduced friction and improved driver feel, in isolating the steering input forces applied to flange 36 in FIG. 2 from the roller reaction forces which constitute the output of the power steering system and are applied to flange 37. Another feature of the resulting design is a simple mechanism serving to equalize the output forces exerted by the three rollers (35) in each set as described for FIG. 2. Such equalization occurs naturally in a modem torque-controlled automotive CVT (as described for instance in Patent Specification EP-B-0444086) where the rollers are positioned hydraulically. However, a lack of exact equalization could be expected, and could create problems, in the simpler CVT which would be economical for a power-steering or other auxiliary drive, and in which the orientation of each roller is controlled by a direct mechanical connection between that roller and the steering wheel 1.

The first difference to note between the embodiments of FIGS. 3 and 4 is that in the latter Figure the linkage (138, 139, 142, 143, 144) connecting the roller carriage 33 to flange 36 (and so to shaft 3 and steering wheel 1) is now confined to the "input" side of the system and makes no contact with reaction plate 141, and that slot 40 is no longer present.

The other main difference, relating now to the "output" side of the system, is that the roller carriage is essentially in two parts. The first part 54 is similar to item 33 of FIG. 3, but carries at its center a "rose" or other articulating joint 55, the central ball 56 of which carries a rod 57 connected to a frame 58 which constitutes the second part of the carriage. A rod 59 projects from frame 58 in a manner similar to that in which rod 138 projects from frame 33. Rod 59 is pivoted at 60 to one arm 61 of a bell crank 62 the vertex of which is pivotally mounted at 63 on the reaction plate 141. The other arm of bell crank 62 carries a pin 64 which slides in a slot 66 formed in the "floating" equalization plate 52 already described with relation to FIG. 2. As has already been pointed out, the single roller 35 shown in FIGS. 3 and 4 will be one of a set of three transmitting traction across a toroidal cavity between an input toroidal disc 7 and a corresponding output disc 9, and the three rollers will be located at equal angular intervals around the axis of the shaft 3. Nominally, therefore, the pins 64 will also lie at equal angular intervals on an imaginary circle coaxial with the rod 3, and the plate 52 will itself also be coaxial. Should the thrusts exerted (by way of carriage parts 58 and rods 59) of the three rollers not be quite equal, however, the effect of the inequality will be to move the pins 64 and thus move the plate 52 slightly off-axis until it reaches an equilibrium position, in which the relative angular setting of the three bell cranks will be such that equal turning forces will be applied to the reaction plate 141 by each of the bell cranks 62, at its respective pivotal connection 63. By forming the arcs of the slots 66 nominally concentric with shaft 3 (i.e. 45), the forces which the pins 64 exert upon the plate 52 to move it are substantially radial only, and without any circumferential component that would tend to rotate the plate.

The following potential advantages of the embodiments of the invention shown in all the Figures of drawings should be particularly noted. Firstly that because the entire CVT rotates in common with the members from which it receives its input and to which it delivers its output, there are no problems associated with the fact that while the shaft 3 can rotate through over three revolutions, the power steering effect should come into operation when there is only a small angular error—say 2°—between shaft 3 and tube 20. Secondly, that the variator naturally rests with the rollers 35 at a 1:1 ratio when stationary, thereby avoiding any tendency to steer.

While the invention has been illustrated in the drawings only as applied to a power-assisted steering system, it will be apparent to the man skilled in the art that it is capable of general application to position servos in which power assistance may be useful to ensure that the hand-powered or other lightly-powered movements of a rotary input member are followed by a concentric but more massive rotary output member. Such applications include a powered winch, in which the drum is power-driven to follow a manually-operated handle, or a rotary crane or machining head in which high power drives cause the cab and turret respectively to follow the movements of rotary controls that are themselves operated either directly by hand, or with only modest power assistance.

I claim:

1. A position servo system comprising:
    a driven mechanism (4);
    a first rotary actuating member (1, 3) by which an operative control is applied to the driven mechanism (4);
    a continuously-variable-ratio transmission having a roller assembly; and
    means responsive to an error (34) (20, 37, 51, 2) between a position of the driven mechanism (4) and the first rotary actuating member (1, 3) for varying a position of at least one roller thereby to create a power output from the continuously-variable-ratio transmission to apply torque to the driven mechanism to diminish the error.

2. The system according to claim 1 wherein the means (34) (20, 37, 51, 2) comprises a first mechanical connection (34) between the roller assembly of the continuously-variable-ratio transmission and the first rotary actuation member (1, 3) and a second connection (20, 37, 51, 2) between the at least one roller of the continuously-variable-ratio transmission and the driven mechanism (4).

3. The system according to claim 1 wherein the driven mechanism is a steering mechanism and the system comprises a power-assisted steering position servo system.

4. The system according to claim 1 wherein the output of the continuously-variable-ratio transmission is applied to the driven mechanism by way of a second rotary actuating member (20) coaxial with the first rotary actuating mechanism.

5. The system according to claim 4 wherein the driven mechanism is a steering mechanism and the system comprises a power-assisted steering position servo system and the first and second rotary actuating members respectively comprise a central shaft and a surrounding tube.

6. The system according to claim 1 wherein the continuously-variable-ratio transmission comprises a toroidal-race-rolling-traction variator.

7. The system according to claim 6 wherein the continuously-variable-ratio transmission includes an epicyclic gear set (6) which includes double-planets for reversing a direction of rotation between a sun and planet carrier gears.

8. The system according to claim 1 wherein the means (34) (20,37,51,2) comprises a first mechanical connection (34) between the roller assembly of the continuously-variable-ratio transmission and the first rotary actuation member (1,3) and a second connection (20, 37, 51, 2) between the at least one roller of the continuously-variable-ratio transmission and the driven mechanism (4), and the first mechanical connection between the first rotary actuating member (1, 3) and the continuously-variable-ratio transmission comprises at least one carriage (33) of the continuously-variable-ratio transmission so as to alter an orientation of the at least one roller and thus a transmitted ratio when the driven mechanism is activated.

9. The system according to claim 1 wherein the means responsive to the error (34) (20, 37, 51, 2) comprises a first mechanical connection (34) between the roller assembly of the continuously-variable-ratio transmission and the first rotary actuation member (1, 3) and a second connection (20, 37, 51, 2) between the at least one roller of the continuously-variable-ratio transmission and the driven mechanism (4), and the second connection between the continuously-variable-ratio transmission and the driven mechanism is by way of a member responsive to a torque reaction experienced by the rollers.

10. The system according to claim 1 further including a torque limiter (21) for limiting torque which the continuously-variable-ratio transmission can apply to the driven mechanism.

11. The system according to claim 1 wherein the continuously-variable-ratio transmission includes an epicyclic gear set (6) which includes double-planets for reversing a direction of rotation between the sun and planet carrier gears, a first component of the epicyclic gear set is connected to one of input and output discs of the continuously-variable-ratio transmission, a second component of the epicyclic gear set is attached to the other of the input and output discs of the continuously-variable-ratio transmission and also to a driving motor, and a third component of the epicyclic gear set is attached to a fixed reaction member by way of a torque-limiting device.

12. The system according to claim 1 wherein the continuously-variable-ratio transmission includes an epicyclic gear set (6) which includes double-planets for reversing a direction of rotation between the sun and planet carrier gears and a first component of the epicyclic gear set is connected to one of input and output discs of the continuously-variable-ratio transmission, a second component of the epicyclic gear set is attached to the other of the input and output discs of the continuously-variable-ratio transmission and also to a driving motor, and a third component of the epicyclic gear set is attached to a fixed reaction member by way of a torque-limiting device, and the first, second and third components of the epicyclic gear set are respectively a sun, a planet carrier and an annulus gear.

13. The system according to claim 1 further including a unidirectional device (51) which facilitates transfer of drive through the system, in a reverse direction, so that the first rotary actuating member responds to a position of the driven mechanism in the event that the first rotary actuating member is not under operative control.

14. The system according to claim 1 wherein the system includes a ratio-varying component of the continuously-variable-ratio transmission and said ratio-varying component is a toroidal-race rolling-traction variator, a plurality of rollers transmit traction across a common cavity separating toroidal input and output discs, the system includes a second connection which comprises force transmitting linkages (59, 61, 62) connecting a carriage of each of the plurality of rollers to the driven mechanism, and the force transmitting linkages each include a pivotal connection (64) to a movable force-equalizing member (52) capable of seeking an equilibrium position in which equal forces are exerted on the driven mechanism by all of the plurality of rollers.

15. The system according to claim 1 wherein the system includes a ratio-varying component which comprises a toroidal-race rolling-traction variator, a plurality of rollers transmit traction across a common cavity separating toroidal input and output discs, a second connection comprises force-transmitting linkages (59, 61, 62) connecting a carriage of each of the plurality of rollers to the driven mechanism, and force transmitting linkages each include a pivotal connection (64) to a movable force-equalizing member (52) capable of seeking an equilibrium position in which equal forces are exerted on the driven mechanism by all of the plurality of rollers and the force-equalizing member is disposed nominally concentrically around the first actuating member, but is capable of moving out of concentricity to reach the equilibrium position.

16. The system according to claim 1 wherein the system includes a ratio-varying component which comprises a toroidal-race rolling-traction variator, a first connection to the first actuating member and a second connection to the driven mechanism are both made with a plurality of carriages of the continuously-variable-ratio transmission, the plurality of carriages each comprise first and second parts with an articulated joint (55) therebetween, and the first and second connections are respectively made with the first and second part of each of the plurality of carriages.

* * * * *

UNITED STATES PATENT AND TRADEMARK OFFICE
CERTIFICATE OF CORRECTION

PATENT NO. : 6,066,067
DATED : May 23, 2000
INVENTOR(S) : Christopher John Greenwood It is certified that error appears in the above-identified patent and that said Letters Patent is hereby corrected as shown below:

[73] Assignee: Torotrak (Development) Limited, Leyland, United Kingdom

Signed and Sealed this

Thirty-first Day of July, 2001

*Attest:*

NICHOLAS P. GODICI
*Attesting Officer*  *Acting Director of the United States Patent and Trademark Office*